United States Patent
O'Keefe et al.

(10) Patent No.: US 10,149,535 B2
(45) Date of Patent: Dec. 11, 2018

(54) MOUNT BRACKET

(71) Applicant: Aussie Brackets Pty Ltd, Pakenham, Victoria (AU)

(72) Inventors: Wayne O'Keefe, Pakenham (AU); Shane Bernard Fewster, Pakenham (AU)

(73) Assignee: Aussie Brackets Pty Ltd, Pakenham, Victoria (AU)

( * ) Notice: Subject to any disclaimer, the term of this patent is extended or adjusted under 35 U.S.C. 154(b) by 4 days.

(21) Appl. No.: 15/310,550

(22) PCT Filed: May 5, 2015

(86) PCT No.: PCT/AU2015/000266
§ 371 (c)(1),
(2) Date: Nov. 11, 2016

(87) PCT Pub. No.: WO2015/172176
PCT Pub. Date: Nov. 19, 2015

(65) Prior Publication Data
US 2017/0095076 A1    Apr. 6, 2017

(30) Foreign Application Priority Data
May 13, 2014   (AU) ................................ 2014901770

(51) Int. Cl.
*A47B 57/04* (2006.01)
*A47B 5/04* (2006.01)
(Continued)

(52) U.S. Cl.
CPC ............ *A47B 57/045* (2013.01); *A47B 5/04* (2013.01); *A47B 57/04* (2013.01); *A47B 96/061* (2013.01);
(Continued)

(58) Field of Classification Search
CPC ............ F16M 13/02; F16M 2200/024; F16M 2200/06; A47B 57/045; A47B 96/061; A47B 5/04; A47B 96/07
(Continued)

(56) References Cited

U.S. PATENT DOCUMENTS 485,589 A  * 11/1892  Ravenel et al. ..... A47B 57/045
                                              16/346
590,872 A  *  9/1897  Allen .................... E06C 7/426
                                              108/134
(Continued)

FOREIGN PATENT DOCUMENTS

AU     2002301702 B2   9/2007
CN       203231039 U   6/2003
(Continued)

OTHER PUBLICATIONS

International Search Report and Written Opinion for Application No. PCT/AU2015/000266 dated Jul. 1, 2015 (8 pages).

*Primary Examiner* — Kimberly T Wood
(74) *Attorney, Agent, or Firm* — Michael Best & Friedrich LLP

(57) ABSTRACT

A foldable mounting bracket including an elongate support member adapted for mounting to a substrate, an elongate arm pivotally coupled to the support member at a pivot point and adapted to pivot between a first raised position generally perpendicular to the support member and a second lowered position generally parallel to the support member, and a strut bridging the support member and the arm wherein a first end of the strut is mounted at a fixed position along a length of the arm and a second end of the strut is mounted to a support slide that is configured to move on the support member such that the pivoting of the arm between the lowered position
(Continued)

and the raised position causes the support slide to move along the support member towards the pivot point.

8 Claims, 13 Drawing Sheets

(51) Int. Cl.
*A47B 96/06* (2006.01)
*A47B 96/07* (2006.01)
*F16M 13/02* (2006.01)

(52) U.S. Cl.
CPC ............ *A47B 96/07* (2013.01); *F16M 13/02* (2013.01); *F16M 2200/024* (2013.01); *F16M 2200/06* (2013.01)

(58) Field of Classification Search
USPC ...... 248/291.1, 240; 108/134, 135, 152, 160
See application file for complete search history.

(56) References Cited

U.S. PATENT DOCUMENTS

| | | | | |
|---|---|---|---|---|
| 749,670 A * | 1/1904 | Gardner | ............... | A47B 57/045 108/9 |
| 1,116,091 A * | 11/1914 | McDonald | ........... | A47B 57/567 108/134 |
| 2,173,569 A * | 9/1939 | Troendle | ................ | B60N 3/004 108/134 |
| 2,239,225 A * | 4/1941 | Gordon | .................... | A47B 5/04 108/134 |
| 2,483,758 A * | 10/1949 | Douglas | ................. | A47B 96/07 248/242 |
| 2,517,183 A * | 8/1950 | Dunn | ....................... | A47B 5/04 108/134 |
| 2,566,765 A * | 9/1951 | Graham | .................. | F24C 15/36 108/134 |
| 2,774,640 A * | 12/1956 | Harmon | ................. | B60N 3/004 108/134 |
| 2,988,232 A * | 6/1961 | Koett | .................... | A47B 57/045 108/134 |
| 2,992,871 A * | 7/1961 | Freeman | .................. | A47B 1/04 108/134 |
| 4,253,689 A | 3/1981 | McKee | | |
| 4,460,105 A * | 7/1984 | Cox | ....................... | E05C 17/38 217/60 C |
| 4,597,473 A * | 7/1986 | Peck | ...................... | A01M 31/02 108/152 |
| 4,791,873 A * | 12/1988 | Towfigh | .................. | A47B 5/04 108/10 |
| 5,137,240 A * | 8/1992 | Van Meter | ........... | A47G 25/845 211/35 |

FOREIGN PATENT DOCUMENTS

DE       2844389 A1 *   4/1979   .......... A47B 57/045
NL       8901747 A      2/1991

* cited by examiner

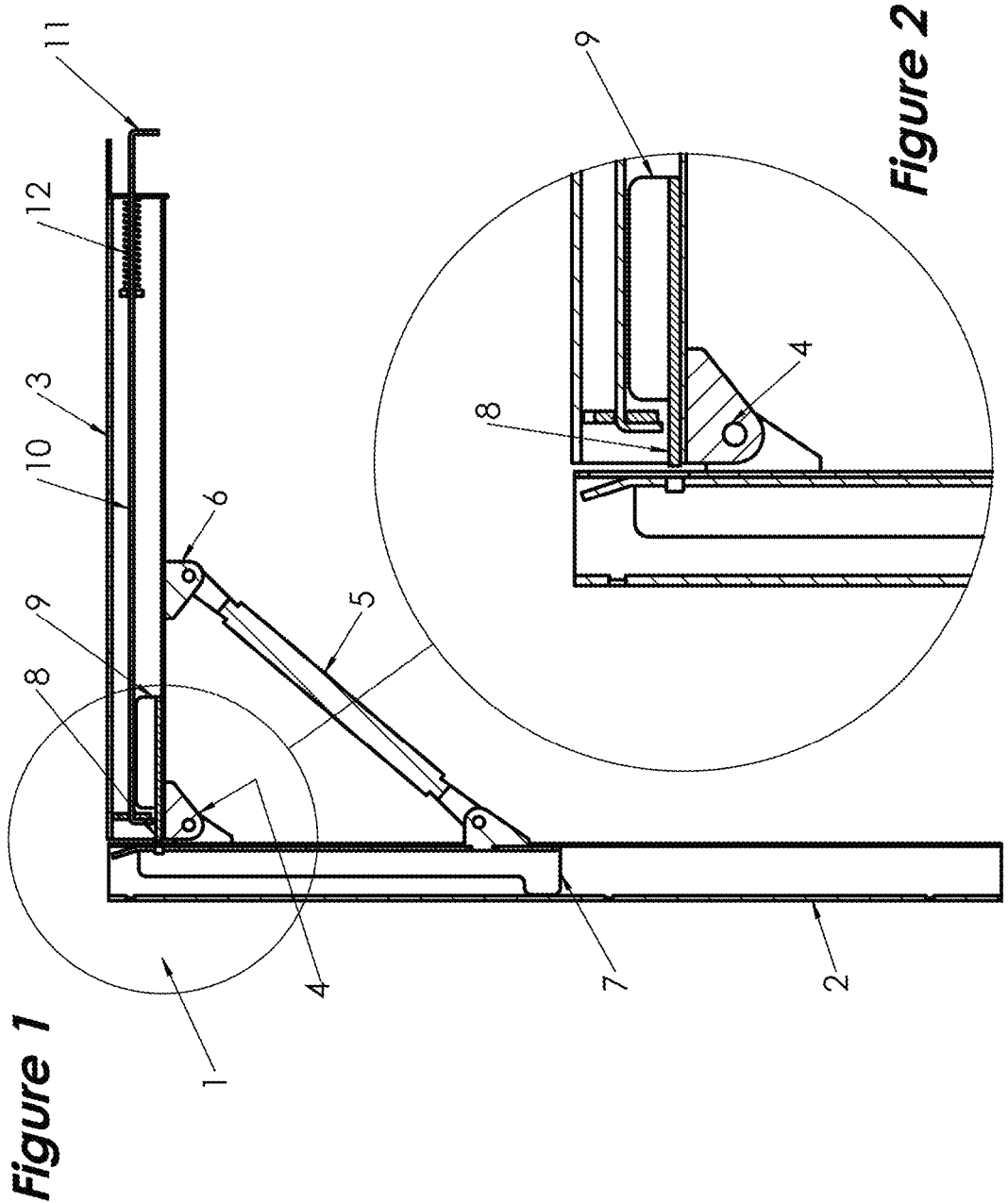

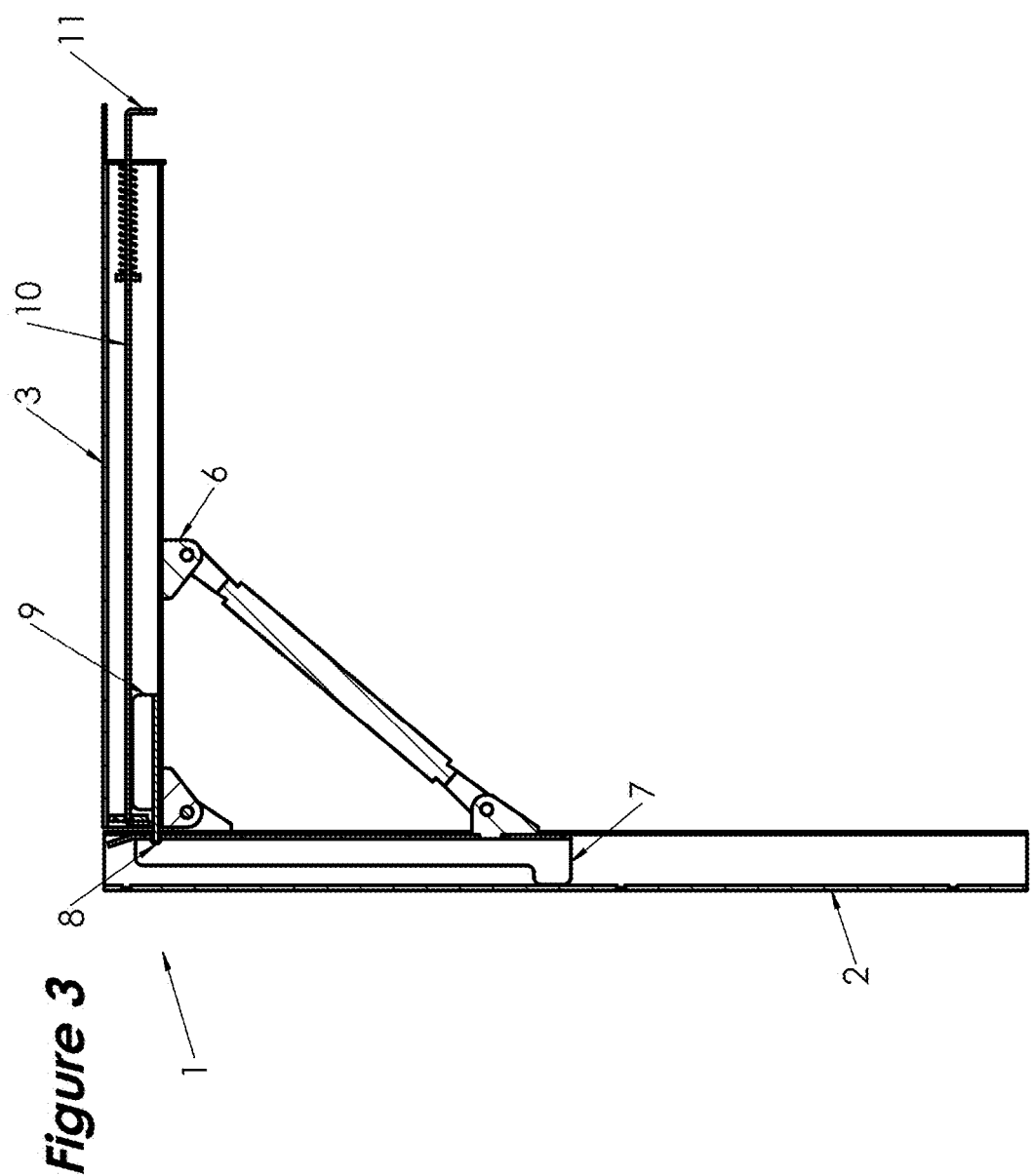

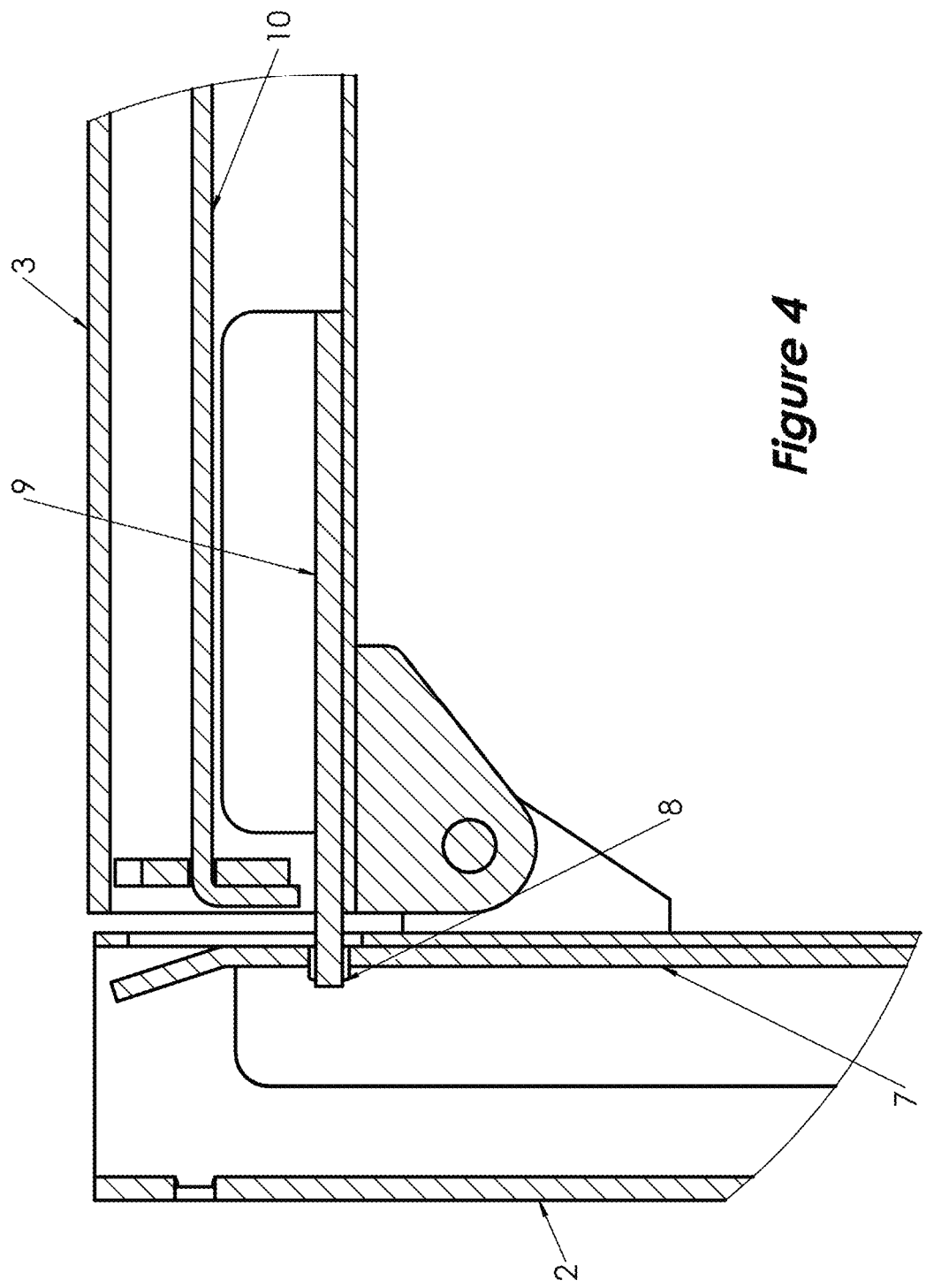

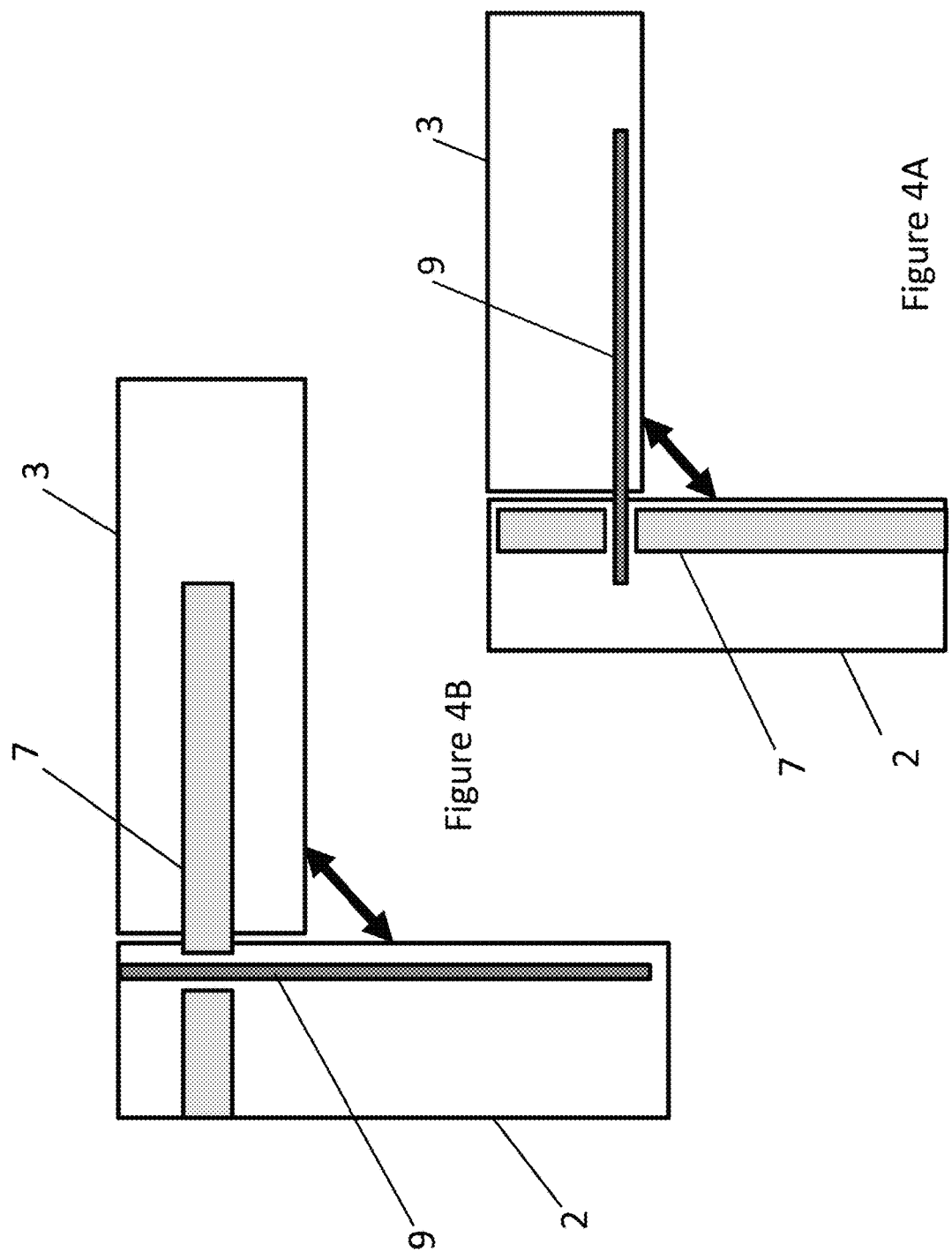

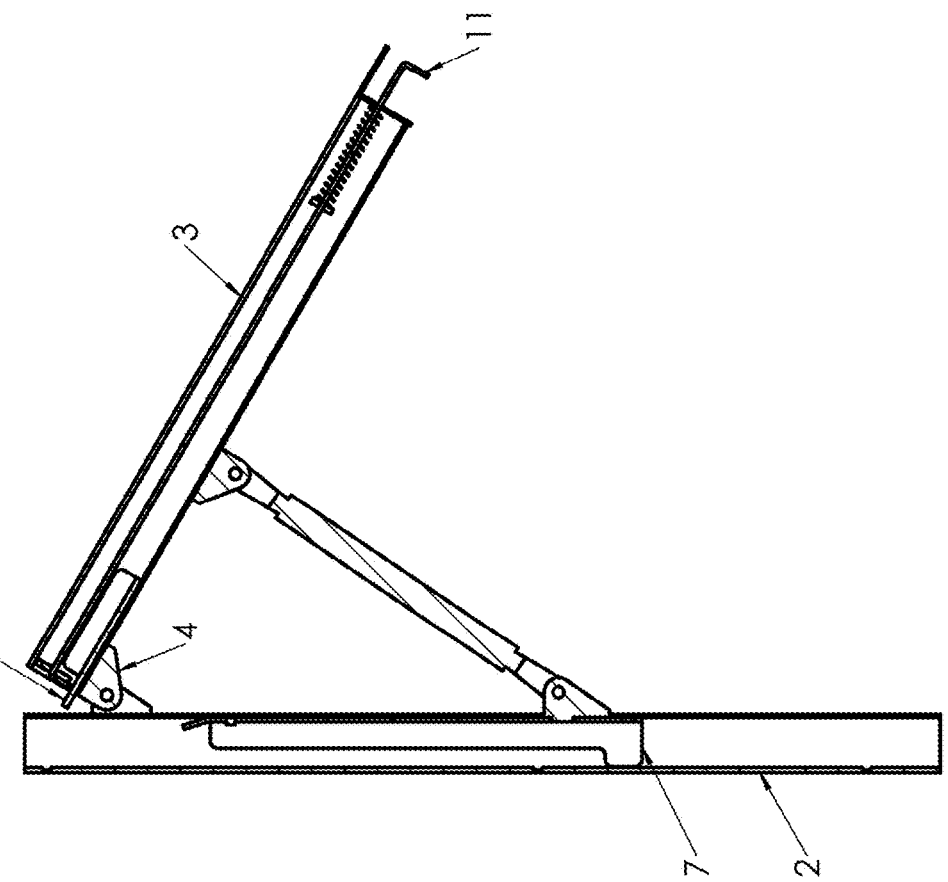
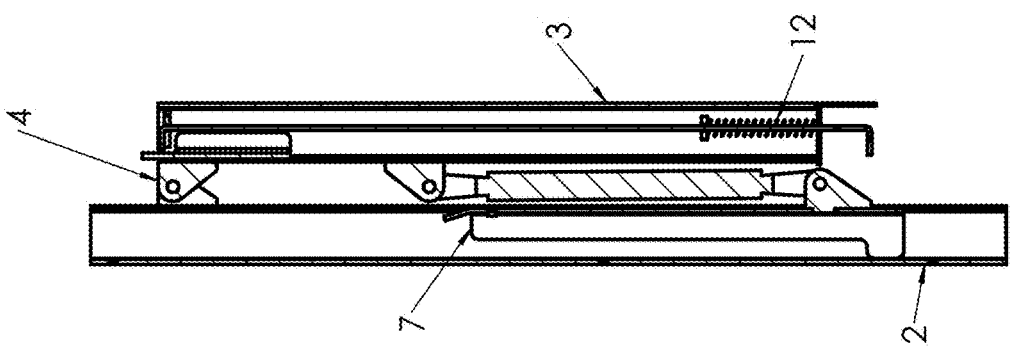

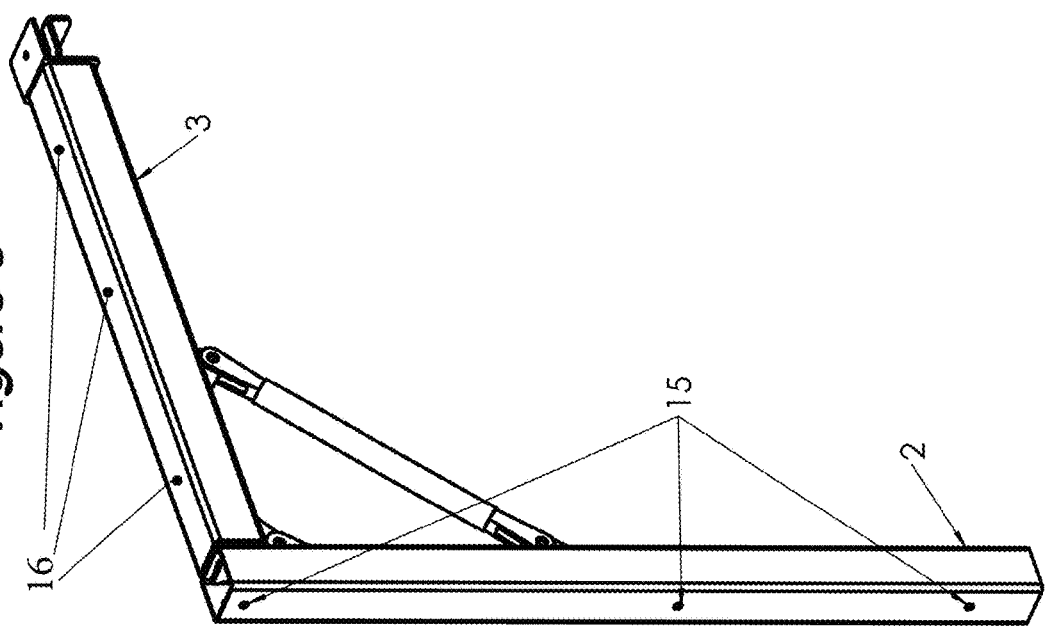
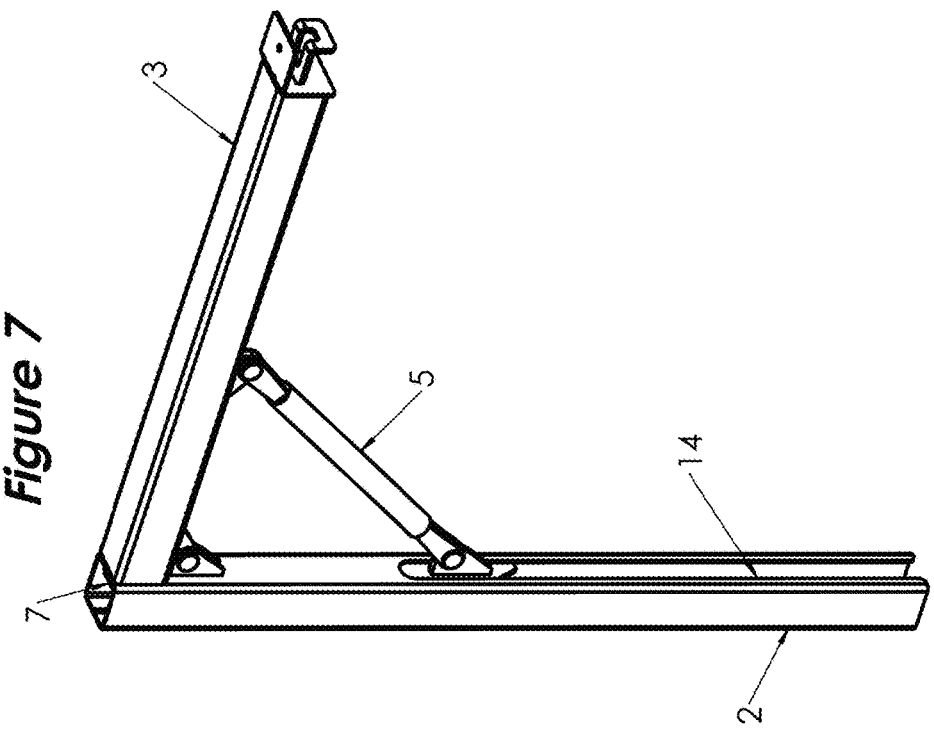

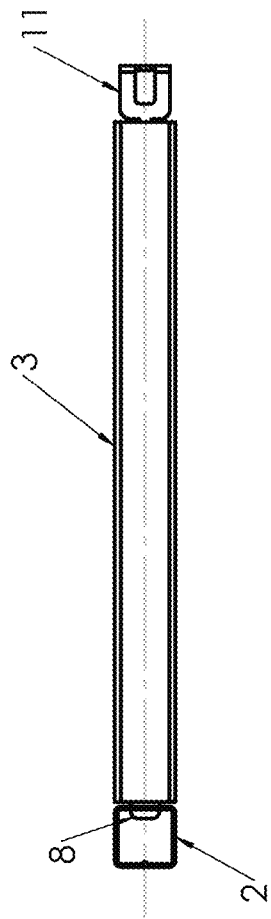

MOUNT BRACKET

INTRODUCTION AND BACKGROUND TO INVENTION

This invention relates to bracketing systems and in particular to a robust, foldable, adjustable and lockable right angle bracket. Right angle bracketing systems find application is a wide range of situations ranging from light weight shelving to heavy duty work benches and the like.

Permanent brackets can be readily manufactured in a range of grades and load bearing capabilities, but such brackets are not applicable for use when a fold down shelf for a bench is required.

An advantage of the current invention is to provide an improved mount bracket.

STATEMENT OF INVENTION

According to one form of the invention there is provided a foldable mounting bracket including an elongate mountable support member adapted for mounting to a substrate, an elongate arm mount pivoted to said mounting bracket and adapted to pivot between a first raised position generally perpendicular to said support member and a second lowered position generally parallel to said support member and a strut bridging said support member and said arm mount wherein a first end of said strut is mounted at a fixed position along the length of said arm and the second end is mounted to a support slide telescopically engaged with said support member such that the pivoting of said arm between said lowered position to said raised position causes said support slide to move telescopically between a position remote from said pivot point to a position adjacent said pivot point wherein said arm includes a latch adapted for telescopic movement along the length of said arm between a first retracted position retaining the latch within the arm and a second extended position projecting said latch from said arm and engaging said support slide to lock same against telescopic movement away from said pivot point thereby locking said arm in said first raised position.

The strut may be a turn buckle comprising a threaded central core with opposing threaded eye bolts at either end allowing adjustments of the raised position of the arm mount relative to the support member when the bracket is in the first raised position.

The pivot between the arm mount and the support member may be positioned at the first terminal end of the arm mount thereby allowing snug abutment of the arm mount to the support member when the arm mount is in the first raised position.

The latch incorporated in the pivoted arm mount may be fitted to a carriage providing snug telescopic movement along the internal length of the arm, the above providing rigid engagement of the latch to the telescopic support slide.

The support member may include a slider access slot allowing the strut to be mounted at a variable position along the length the length of the support member by virtue of the strut's connection to the telescopically movable support slide which is adapted free movement up and down the length of the support member.

The support slide may include a keeper in the form of an aperture formed at the first end which is adapted to cooperate with a latch by receiving the latch so as to lock the support slide against telescopic movement away from the pivot to therefore lock the arm mount in the first raised position.

The latch may include a terminal locking lip which is adapted corporate with a keeper aperture so as to prevent the latch retracting from the locked position when the raised arm is subject to a return force endeavouring to return the raised arm to the second lowered position.

DRAWINGS

Forms of the invention will now be described by way of example only with reference to particular preferred embodiments as detailed in FIGS. 1 to 15 and the legend, in which:

FIG. 1 shows a side view of the bracket in cross-section in the fully raised position with the locking latch retracted.

FIG. 2 shows a cross-section detail of the raised bracket with the locking latch retracted.

FIG. 3 shows a side view of the bracket in cross-section in the fully raised position with the locking latch engaged.

FIG. 4 shows a cross-section detail of the raised bracket with the locking latch engaged.

FIG. 4A shows a schematic illustration of the latch and support slide of FIG. 4 as positioned in relation to the arm and the support member.

FIG. 4B shows a schematic illustration of the latch and support slide reversed to be engaged with the other of the arm and the support member as illustrated in FIG. 4A.

FIG. 5 shows a side view of the bracket in cross-section in the fully lowered position.

FIG. 6 shows a side view of the bracket in cross-section in the partially lowered/raised position.

FIG. 7 shows a front isometric view of the fully raised bracket.

FIG. 8 shows a rear isometric view of the fully raised bracket.

FIG. 9 shows a plan view of the fully raised bracket.

LEGEND

Figure 10:
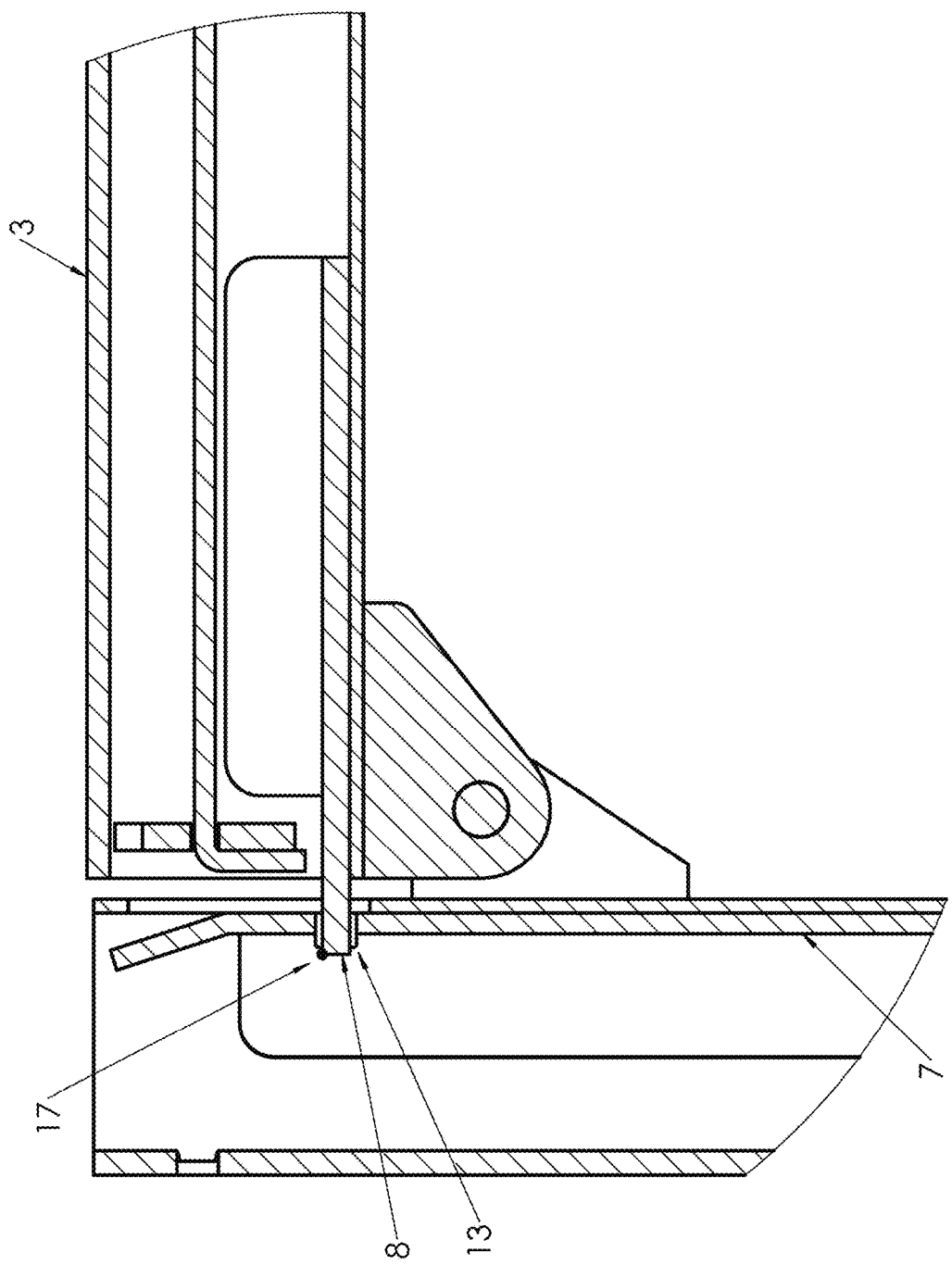
FIG. 10 Shows detail of the latch locking lip.

1. Bracket
2. Mountable Support Member
3. Pivoted Arm Mount
4. Fixed Pivot
5. Strut
6. Fixed Position
7. Telescopic Support Slide
8. Telescopic Latch
9. Latch Carriage
10. Latch Release Rod
11. Latch Release Handle
12. Latch Bias
13. Keeper Aperture
14. Slider Access Slot
15. Support Member Mount Holes
16. Arm Mount Holes
17. Latch Locking Lip 18. Mounting plate
19. End mount Embodiments of the invention will now be described in detail.

DETAILED DESCRIPTION

Referring firstly to FIGS. 1 and 2 an embodiment provides a foldable generally right angular bracket adapted for mounting to a substrate where the bracket can be opened and closed thereby providing compact space saving storage for the bracket when not in use, but, providing a ready means of erecting the bracket into a locked position and providing a degree of adjustability once locked. The bracket comprises an elongate mountable support member 2 in the form of a channel which adapted for mounting to a substrate. The mountable support member can be applied vertically to a substrate in the form of a wall or the like or in an alternative embodiment can be mounted to a horizontal substrate if so required.

The bracket further includes an elongate arm mount 3 which is pivoted 4 at a first end to the mountable support member with the pivot point preferably being positioned at the terminal end of the pivoted arm mount and also preferably positioned at the terminal end of the mountable support member 2. The pivoting attachment allows the arm mount to be moved between the first raised position with the arm adopting a generally perpendicular aspect with respect to the support member and the second lowered position with the arm being drawn down to lie against the support member in generally parallel alignment.

The arm mount 3 and support member 2 are connected by way of strut 5 which bridges the arm mount and the support member. In order to allow movement of the arm around the pivot from the first raised position to the second lowered position the strut is pivotally attached at a first end to a fixed position 6, generally midway along the length of the pivoted arm mount and is fitted at its other end to a telescopic support slide 7 adapted for telescopic engagement to the inside of the support member 2 with the strut pivotally attached to the telescopic support slide whereby movement of the arm mount from the first raised to the second lowered position causes the telescopic support slide to telescopically move back and forth along the length of the support member.

In order to lock the pivoting arm mount in the first raised position the pivoted arm mount is provided with an internal latch 8 fitted to a latch carriage 9 with the latch carriage being adapted for snug engagement and telescopic movement along the length of the pivoted arm mount. The latch carriage is connected to an elongate latch release rod 10 extending the length of the pivoted arm mount 3 and exiting the arm mount 3 terminating in a latch release handle 11. The latch can therefore be moved between a retracted position by pulling the latch release handle against the latch bias 12 so as to withdraw the latch carriage 9 and telescopic latch 8 into the confines of the pivoted arm mount 3 and a second extended position releasing the handle 11 which allows the latch bias 12 to act on the release rod 10 to project the latch 8 from the arm. The latch bias may be a spring or any other means biasing the latch to the extended position. With the arm in the raised position, releasing the latch release handle causes the latch to extend beyond the extent of the pivoted arm mount so as to engage a keeper aperture 13 formed toward the terminal end of the support slide 7. Once the latch has engaged the keeper 13, any movement of the telescopic support slide 7 is resisted thereby preventing the telescopic support slide from moving away from the fixed pivot region 4 and preventing the pivoted arm mount 3 from moving away from the first raised position towards the lowered second position.

In this manner, the general mechanics of the bracket allow the bracket to be moved between a folded down fully retracted position to an erected position with the pivoting arm mount raised to a generally perpendicular orientation around the fixed pivot 4 with respect to the support member 2 so as to provide a traditional right angle bracket which is then locked in position and prevented from returning against any forces applied to the pivoted arm mount.

In order to provide a degree of adjustability and slight deviation from a right angle orientation between the support member and the arm strut 5 can be provided in the form of a turn buckle whereby rotation of the body of the turn buckle against the opposing threading of the eye bolts allows adjustment of the angle of the arm mount from within the locked position.

Referring now to FIG. 3, the latch 8 can be seen in the extended position with the latch protecting through the support member 2 so as to engage the telescopic support slide 7 thereby locking the mount in the raised position. FIG. 4 provides details of the locking mechanism where the telescopic latch 8 can be seen to traverse the keeper aperture 13 of the telescopic support side 7, the above preventing telescopic movement of the support slide and corresponding movement of the arm mount 3 away from a locked position.

FIG. 4A is a simplified schematic of FIG. 4, illustrating the latch and carriage 9 within the arm 3 in locking engagement with the support slide 7 within the support member 2. This arrangement is reversed in FIG. 4B.

FIG. 5 shows the bracket in the second lower position with the arm mount 3 lowered down to rest against the support member 2 in substantially parallel alignment thereby providing a compact folding of the bracket when not in use.

FIG. 6 shows a bracket during intermediate erection or lowering where the user would grasp the arm and pivot it by lifting the arm mount up thereby causing the support slide 7 to move telescopically up the support member 2 toward the fixed pivot 4. As the arm abuts the support member the latch will automatically engage the keeper 13 as the support slide aligns with raised arm.

FIG. 7 shows an isometric view of the bracket in the first raised position. FIG. 7 clearly shows the support slide 7 positioned within the support member 2 and the provision of a slider access slot 14 in the support member 2 allowing the support slide 7 to move telescopically along the length of the support member 2 giving clear access to the strut 5.

FIG. 8 shows a rearward isometric view of the bracket in the raised position and clearly demonstrates the provision of mount hole 15 provided on the support member 2 for mounting to the substrate and similar arm mount hole 16 positioned on the arm mount 3 allowing attachment of a shelf or bench to the arm mount as required.

FIG. 9 shows a plan view clearly detailing the rear extended latch 8 which extends into the support member 2 so as to engage the telescopic slide 7.

In a particularly preferred embodiment the latch 8 is shown in FIG. 10 including a locking lip 17 which serves to act as a stop against the withdrawal of the latch 8 once the arm mount 3 is in a raised position and locked particularly with the application of pressure on the arm mount which in the form of a vertically mounted bracket would be weight applied to the arm mount 3 causing the strut 5 to urge the telescopic support slide 7 to return down the length of the support member 2 away from the fixed pivot point 4 thereby effectively closing the keeper latch aperture 13 down on to the surface of the telescopic latch 8. The downward movement thereby captures the locking lip 17 and prevents the latch from being released whilst pressure is present on the arm mount 3. In this manner the invention provides a safety lock preventing inadvertent release of the bracket when the bracket is in use and bearing weight.

Whilst the bracket of the invention will find application primarily in vertical orientation, the bracket is equally applicable to use on horizontal surfaces so as to provide locking barriers for car parking situations and the like whereby the locking system can incorporate padlocks or keyed locks thereby allowing the ready raising of the pivoted arm mount from the ground which can be locked thereby preventing unauthorised access to a car park or the like.

Figure 11:
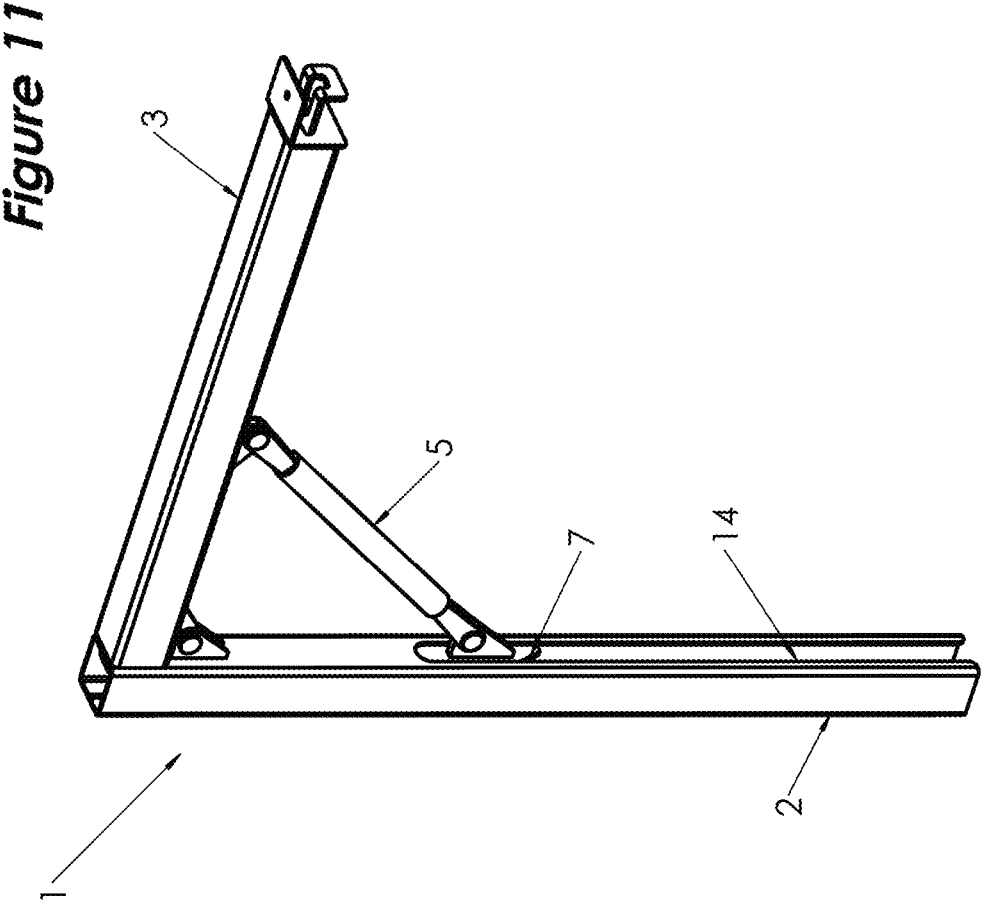
FIG. 11 Shows a perspective view of the fully opened bracket.

In another embodiment of the invention, illustrated in FIG. 11, the arm mount 3 provides at least one mounting plate 18 for fixing benches or seating or the like to the bracket 1. The mounting plate 18 comprises two planar faces, a first planar face being mounted to the exterior of the arm mount 3 and a second planar face having the mount hole 16 therein. The mounting plate 18 can be welded to the arm mount 3 or affixed using an adhesive, bolts, screws or other forms of mechanical attachment.

The mounting plate 18 can be formed from a U-shaped bracket that partially surrounds the arm mount 3, providing a pair of mount holes 16 on either side of the arm mount 3, as illustrated in FIG. 11.

Figure 12:
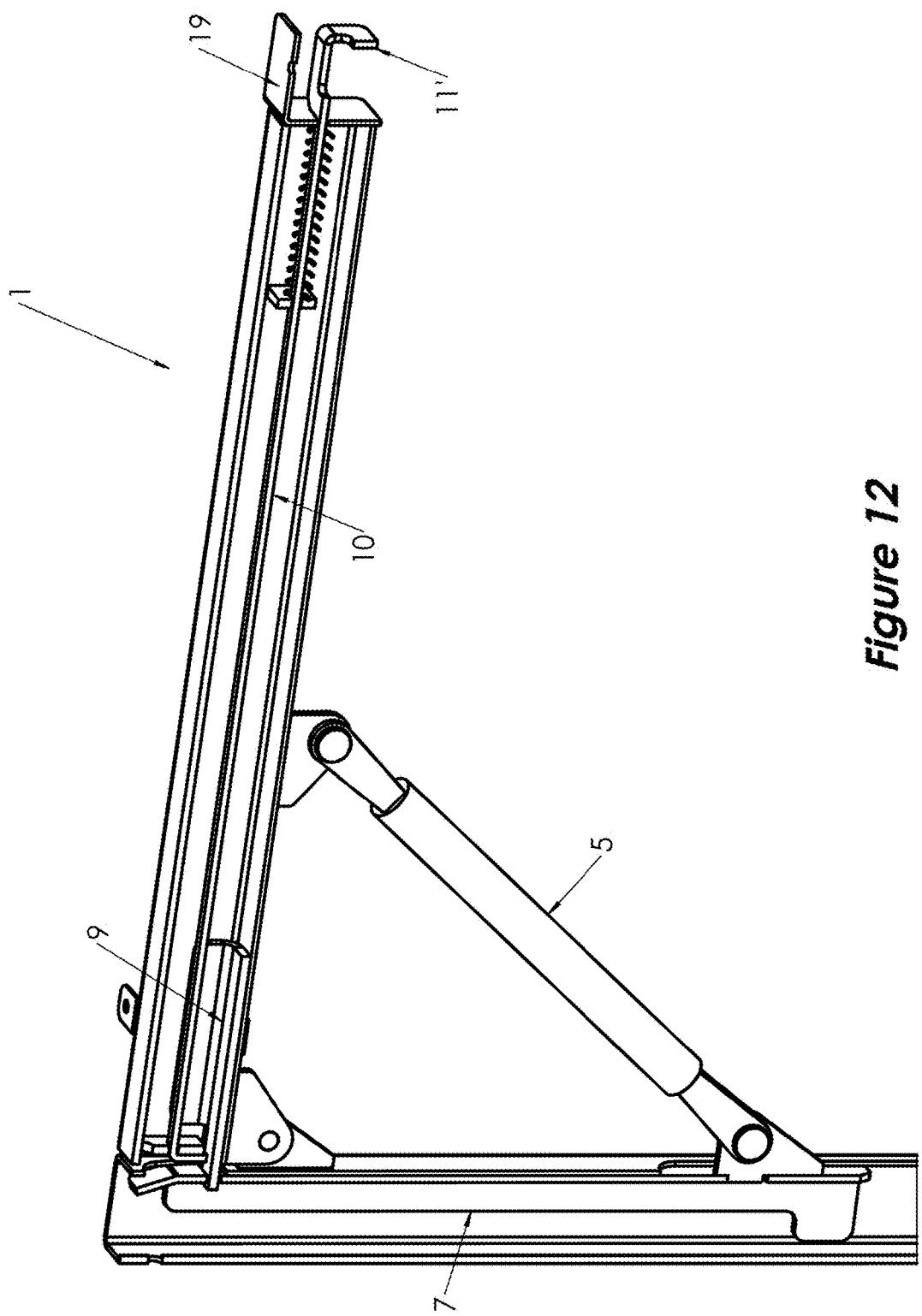
FIG. 12 Shows a perspective cross-sectional view of the opening bracket, illustrating the internal latching mechanism.

Additional an end mount 19 is located at the end of the arm mount 3 in proximity to release latch 11', as shown in FIG. 12. The end mount 19 provides additional mounting holes for attaching and mounting items to the bracket 1. The end mount 19 further provides a form of pump protection for the handle 11' which is packaged within the footprint of the end mount 19.

FIG. 12 shows a cut-away section of the bracket 1 to illustrate the interlocking mechanism between the latch carriage 9, telescopic latch 8 and the telescopic support slide 7.

Release handle 11' is formed from a planar member that can be folded or bent to provide additional form. The handle 11' can be cut, pressed or moulded from a suitably strong material e.g. metal, plastic or the like. The handle 11' can be manufactured separately from the release rod 10. Alternatively, the handle 11' can be integrally formed with the release rod 10.

The handle 11' has a central aperture for engaging a hook or finger to release the handle 11' and thereby retract the telescopic latch 8. The width of the handle 11' is substantially the same width as the arm mount 3, so as to not extend beyond the package of the bracket 1. In some embodiments the handle 11' can be substantially slimmer than the arm mount 3 but preferably the handle 11' does not protrude from under the end mount 19.

When the release handle 11' is pulled away from the arm mount 3, it allows the latch bias 12 to act on the release rod 10, retracting the latch 8 from the access slot 14 in the telescopic support slide 7.

Figure 13:
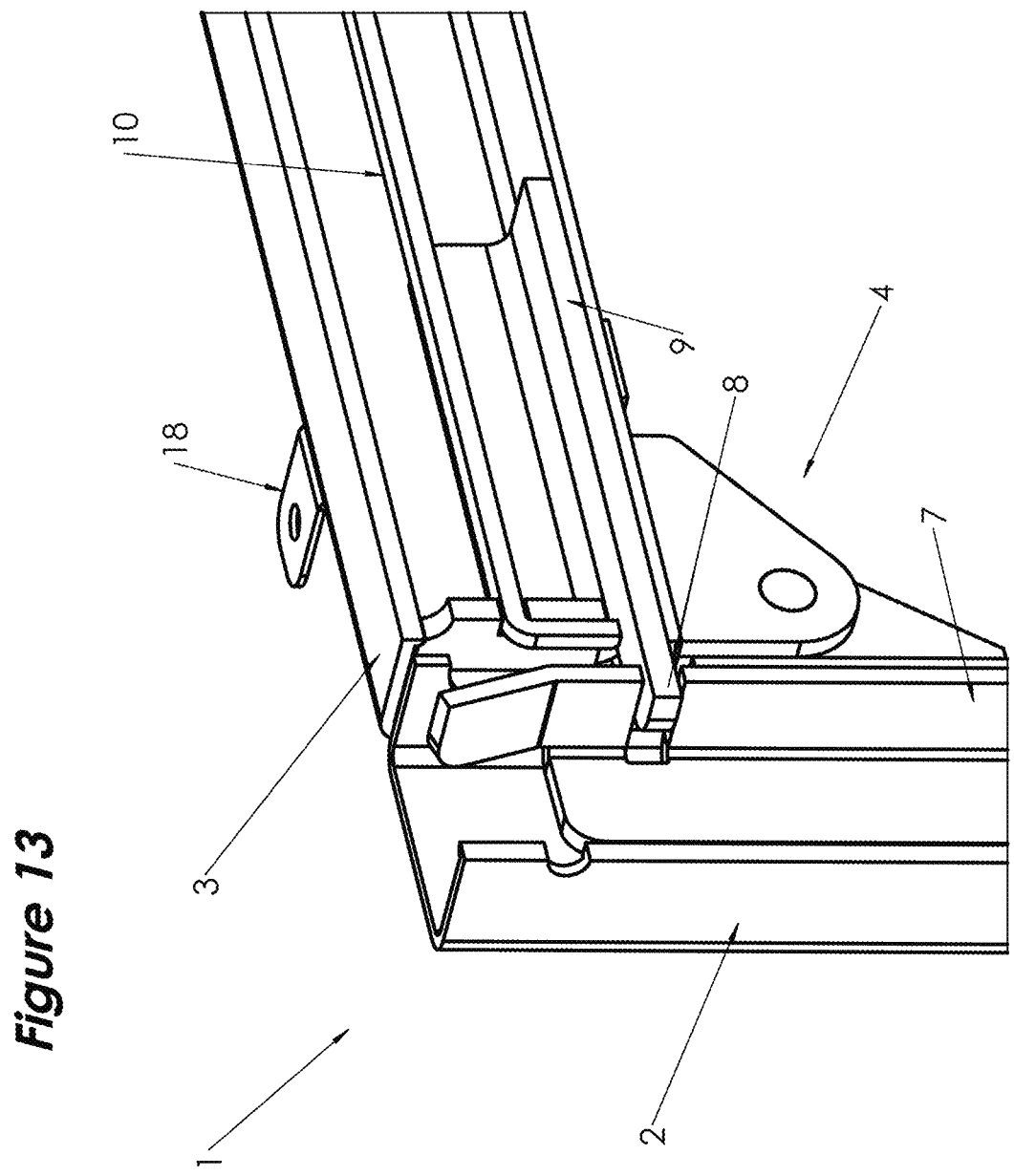
FIG. 13 Shows an enlarged sectional view of a latch carriage and support slide engagement within the bracket.

FIG. 13 illustrates the latch 8 integrally formed with the latch carriage 9. The release rod 10 is posted through a slot in the carriage 9 to provide an engagement between the release handle 11, release rod 10 and the latch 8. As the handle 11' is pulled away from the arm mount 3, the carriage 9 and thus the attached latch 8 is retracted from the access slot 13, allowing the arm mount 3 to release from and pivot away from the support member 2.

Figure 14:
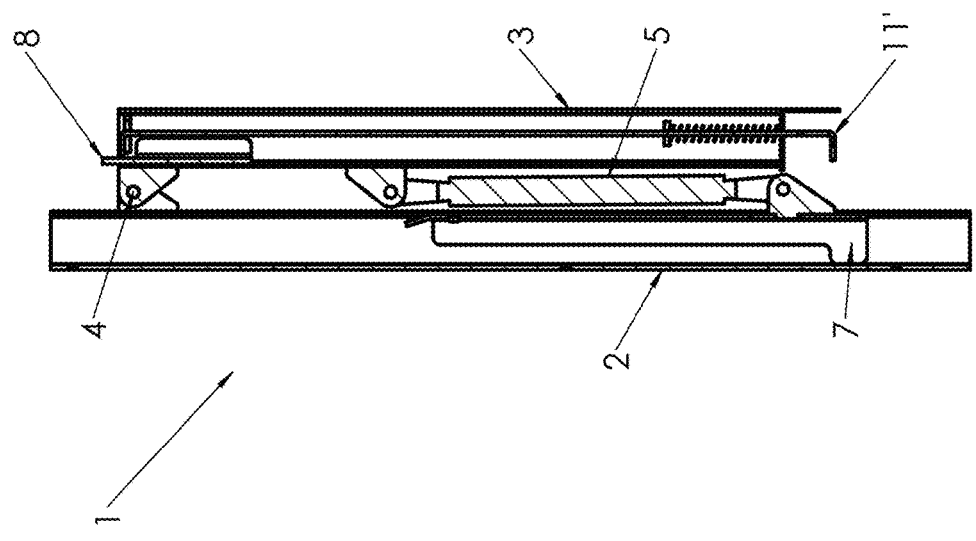
FIG. 14 Shows a side view of the bracket in a closed storage configuration.

FIG. 14, illustrates a cross-section of the bracket 1 in a closed, storage position. In the storage position the arm mount 3 and the support member 2 lie substantially parallel to one another. The depth of the pivot 4 is sufficient to neatly package the strut 5 between the support member 2 and the arm mount 3. In the storage configuration, the telescopic support slide 7 can be seen housed within the support member 2 at an opposing end to that of the pivot 4.

Figure 15:
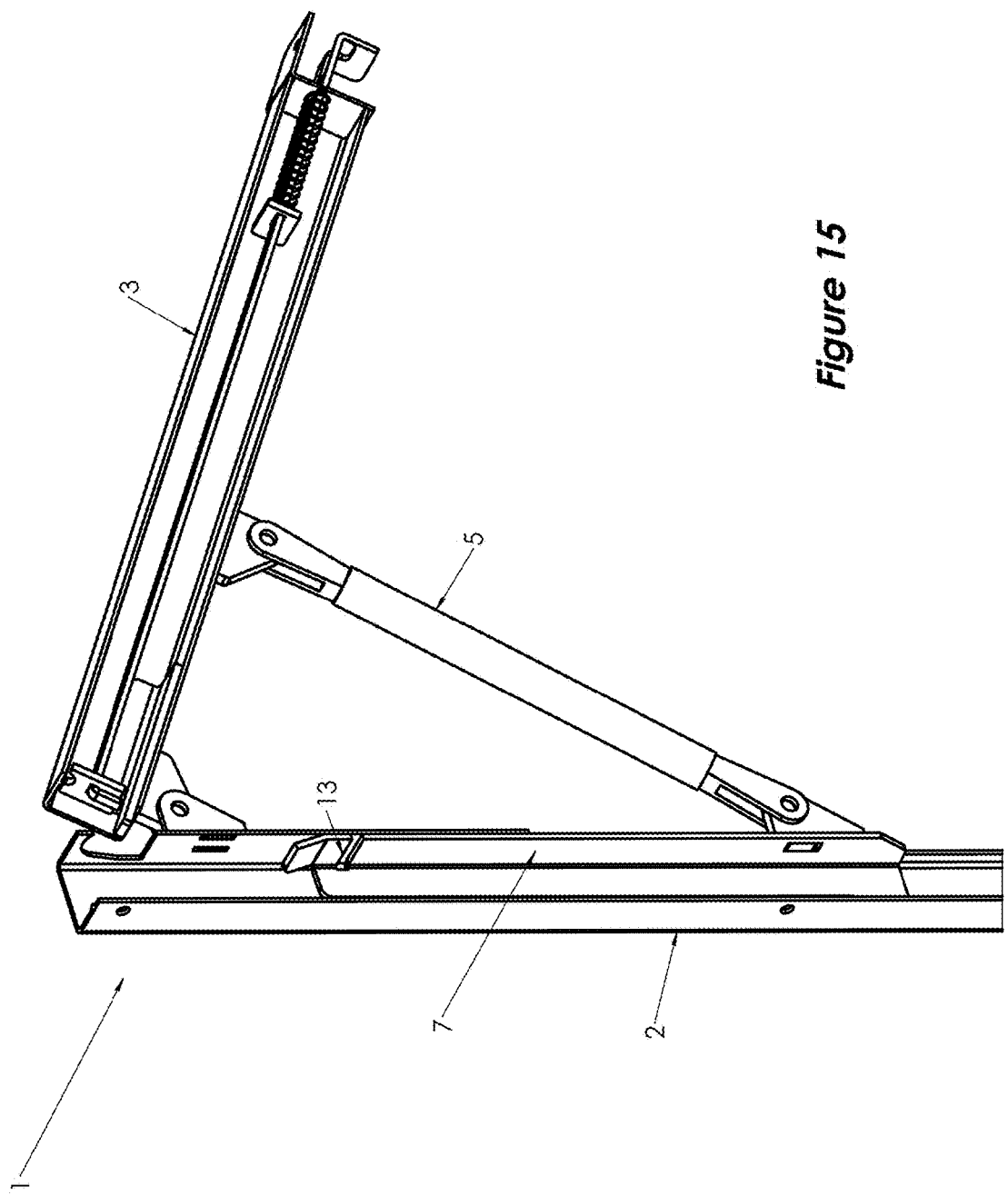
FIG. 15 Shows a cross-sectional view of the bracket in a partially open, un latched, configuration.

FIG. 15 illustrates the bracket 1 in a partially open and unlocked configuration. The telescopic support slide 7 is urged towards the pivot 4, as release handle 11 is rotated towards the support member 2. As the telescopic support slide 7 moves towards the pivot 4, the access slot 13 moves into alignment with the protruding latch 8 (as illustrated in FIG. 10) whereby the latch 8 is received and retained within the slot 13, holding the bracket 1 in the open position.

In another embodiment of the invention the positioning of the telescopic support slide can be repositioned into the pivoted arm mount with strut orientation being effectively reversed and having the locking action and telescopic latch 8 transferred to the mountable support member without detracting from the general operations or mechanics of the invention, as illustrated in schematic FIG. 4B.

The invention provides for the first time a highly versatile, foldable, adjustable, robust and lockable folding mounting bracket finding ready application in a range of situations from benches for seating in gymnasiums, schools and the like, work benches which can be adapted for folding and erection when required having the comfort and convenience of a secure locking system preventing inadvertent failure of the bracket.

The invention claimed is:

1. A foldable mounting bracket including:
   an elongate support member adapted for mounting to a substrate,
   an elongate arm pivotally coupled to the support member at a pivot point and adapted to pivot between a first raised position generally perpendicular to the support member and a second lowered position generally parallel to the support member, and
   a strut bridging the support member and the arm wherein a first end of the strut is mounted at a fixed position along a length of the arm and a second end of the strut is mounted to a support slide that is configured to move on the support member;
   such that the pivoting of the arm between the second lowered position and the first raised position causes the support slide to move along the support member towards the pivot point;
   wherein the arm includes a latch adapted for movement along the length of the arm between a first retracted position retaining the latch within the arm, and a second extended position projecting the latch from the arm and thereby engaging the support slide to lock the support slide against movement away from the pivot point thereby locking the arm in the first raised position.

2. The bracket according to claim 1, wherein the strut is a turnbuckle allowing adjustment of the first raised position of the arm relative to the support member.

3. The bracket according to claim 1, wherein the pivot point is positioned at a first terminal end of the arm allowing snug abutment of the arm to the support member in the first raised position.

4. The bracket according to claim 1, wherein the latch is fitted to a carriage for snug movement along the length of the arm.

5. The bracket according to claim 1, wherein the support member includes a sliding access slot allowing the strut to be variably mounted at a plurality of positions along the length of the support member.

6. The bracket according to claim 1, wherein the support slide includes a keeper aperture adapted to co-operate with the latch so as to lock the support slide against movement away from the pivot point so as to lock the arm in the first raised position.

7. The bracket according to claim 6, wherein the latch includes a terminal locking lip adapted to co-operate with the keeper aperture to prevent the latch retracting from the locked position when the arm, in the first raised position, is subject to a weight applied thereto.

8. A foldable mounting bracket including:
   an elongate support member adapted for mounting to a substrate,
   an elongate arm pivotally coupled to the support member at a pivot point and adapted to pivot between a first raised position generally perpendicular to the support member and a second lowered position generally parallel to the support member, and
   a strut bridging the support member and the arm wherein a first end of the strut is mounted at a fixed position along a length of the support member and a second end of the strut is mounted to a support slide that is configured to move on the arm
   such that the pivoting of the arm between the second lowered position and the first raised position causes the support slide to move along the arm towards the pivot point to project the support slide from the arm;
   wherein the support member includes a latch adapted for movement along a length of the support member between a first retracted position retaining the latch within the support member and a second position adjacent the pivot point engaging the projecting support slide to lock the support slide against movement away from the pivot point thereby locking the arm in the first raised position.

* * * * *